US007558040B2

(12) United States Patent
Malingowski et al.

(10) Patent No.: US 7,558,040 B2
(45) Date of Patent: Jul. 7, 2009

(54) TRIP INDICATOR MEMBER, AND LIMITER AND ELECTRICAL SWITCHING APPARATUS INCLUDING A PLURALITY OF TRIP INDICATOR MEMBERS

(75) Inventors: Richard P. Malingowski, Finleyville, PA (US); Steven D. Payne, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 95 days.

(21) Appl. No.: 11/740,522

(22) Filed: Apr. 26, 2007

(65) Prior Publication Data

US 2008/0266732 A1 Oct. 30, 2008

(51) Int. Cl.
*H02H 5/04* (2006.01)

(52) U.S. Cl. ...................................... 361/115; 361/103

(58) Field of Classification Search ................. 361/103, 361/104, 115; 337/206, 265, 267
See application file for complete search history.

(56) References Cited

U.S. PATENT DOCUMENTS

| | | | | |
|---|---|---|---|---|
| 2,526,448 | A | 10/1950 | Amundson et al. | |
| 3,242,291 | A | 3/1966 | Frink | |
| 3,582,586 | A | 6/1971 | Jones | |
| 3,593,251 | A * | 7/1971 | Wilson | 337/186 |
| 3,718,406 | A * | 2/1973 | Onal | 415/111 |
| 3,761,660 | A | 9/1973 | Jones | |
| 3,925,745 | A | 12/1975 | Blewitt | |
| 4,008,452 | A | 2/1977 | Cameron | |
| 4,035,755 | A | 7/1977 | Cameron | |
| 4,099,153 | A | 7/1978 | Cameron | |
| 4,166,266 | A | 8/1979 | Kozacka et al. | |
| 4,167,723 | A | 9/1979 | Wilks | |
| 4,179,677 | A | 12/1979 | Kozacka et al. | |
| 4,251,699 | A | 2/1981 | Wiltgen, Jr. | |
| 4,307,368 | A | 12/1981 | Reid | |
| 4,309,684 | A | 1/1982 | Wilks | |
| 4,319,212 | A | 3/1982 | Leach | |
| 4,339,742 | A | 7/1982 | Leach et al. | |
| 4,340,790 | A | 7/1982 | Boliver | |
| 4,444,671 | A | 4/1984 | Wiltgen, Jr. | |
| 4,520,337 | A | 5/1985 | Cameron | |
| 4,598,332 | A | 7/1986 | Kemeny | |

(Continued)

OTHER PUBLICATIONS

Westinghouse Electric Corporation, "AB DE-ION® TRI-PAC Circuit Breakers Types FB, LA, NB, PB," Apr. 1976, pp. 67-74.

*Primary Examiner*—Danny Nguyen
(74) *Attorney, Agent, or Firm*—Martin J. Moran

(57) ABSTRACT

A limiter includes three current limiters. Each current limiter includes a first end disposed proximate a first housing surface and electrically connected to a corresponding first terminal, a second end disposed proximate a second housing surface and electrically connected to a corresponding second terminal, an elongated body disposed between the ends, and a plunger. Two plungers define a straight line and a third plunger is offset from the straight line. Three indicator members each include a first end, an indicator disposed therefrom, and an opposite second end, which is engaged by a corresponding plunger. The indicator is disposable through a corresponding housing opening. Three springs bias corresponding indicator members away from the second housing surface. The housing carries two indicator members in a first orientation and a third indicator member in a different second orientation. The indicators are positioned in a straight line and are disposable through corresponding housing openings.

18 Claims, 7 Drawing Sheets

U.S. PATENT DOCUMENTS

| | | | |
|---|---|---|---|
| 4,599,671 | A | 7/1986 | Kemeny et al. |
| 4,625,195 | A | 11/1986 | Robbins |
| 4,638,283 | A | 1/1987 | Frind et al. |
| 4,778,958 | A | 10/1988 | Mayer et al. |
| 4,808,963 | A | 2/1989 | Stunzi et al. |
| 4,950,852 | A | 8/1990 | Goldman et al. |
| 4,952,900 | A | 8/1990 | Cameron et al. |
| 4,975,551 | A | 12/1990 | Syvertson |
| 4,995,886 | A | 2/1991 | Cameron et al. |
| 5,471,185 | A | 11/1995 | Shea et al. |
| 5,793,278 | A | 8/1998 | Pohl et al. |
| 2006/0267720 | A1 | 11/2006 | Malingowski et al. |

* cited by examiner

TRIP INDICATOR MEMBER, AND LIMITER AND ELECTRICAL SWITCHING APPARATUS INCLUDING A PLURALITY OF TRIP INDICATOR MEMBERS

BACKGROUND OF THE INVENTION

1. Field of the Invention

The invention pertains generally to electrical switching apparatus and, more particularly, to circuit breakers including a limiter having plural trip indicator members. The invention also relates to limiters and to trip indicators therefor.

2. Background Information

Current limiters employ a current interruption device that rapidly and effectively brings the current to a relatively low or zero value upon the occurrence of a line fault or overload condition.

Circuit protection devices protect electrical equipment from damage when excess current flows in a power circuit due to overload or short circuit conditions. Such devices have a relatively low resistivity and, accordingly, a relatively high conductivity under normal current conditions of the power circuit, but are “tripped” or converted to high or complete resistivity when excessive current and/or temperature occurs. When the device is tripped, a reduced or zero current is allowed to pass in the power circuit, thereby protecting the power circuit conductors and load from electrical and thermal damage until the overload or fault is removed.

Conventional circuit protection or current limiting devices include, but are not limited to, circuit breakers, fuses (e.g., expulsion fuses), thermistors (e.g., PTC (Positive Temperature Coefficient) conductive polymer thermistors), and the like. These devices are current rated for the maximum current the device can carry without interruption under a load.

Circuit breakers typically contain a load sensing element (e.g., a bimetal; a hot-wire; a magnetic element) and separable contacts, which open under overload or short circuit conditions. Most circuit breakers have to be reset manually at the circuit breaker site or through a remote switch.

Fuses typically contain a load sensing fusible element (e.g., metal wire), which when exposed to current (I) of fault magnitude rapidly melts and vaporizes through resistive (R) heating ($I^2R$). Formation of an arc in the fuse, in series with the load, can introduce arc resistance into the power circuit to reduce the peak let-through current to a value significantly lower than the fault current. Expulsion fuses may further contain gas-evolving or arc-quenching materials which rapidly quench the arc upon fusing to eliminate current conduction. Fuses generally are not reusable and must be replaced after overload or short circuit conditions because they are damaged inherently when the power circuit opens.

Various fusible elements, gas-evolving materials and fuses are shown for example in U.S. Pat. Nos. 2,526,448; 3,242,291; 3,582,586; 3,761,660; 3,925,745; 4,008,452; 4,035,755; 4,099,153; 4,166,266; 4,167,723; 4,179,677; 4,251,699; 4,307,368; 4,309,684; 4,319,212; 4,339,742; 4,340,790; 4,444,671; 4,520,337; 4,625,195; 4,638,283; 4,778,958; 4,808,963; 4,950,852; 4,952,900; 4,975,551; 4,995,886; and 5,471,185.

Low voltage circuit breakers are often connected in series with so-called limiters, in order to significantly increase the short circuit switching capacity in low voltage electrical networks and to significantly limit the cut-off currents. Such limiters are designed to transition rapidly, in case of a short circuit, from a low-resistance state to a high-resistance state and, thus, provide rapid current limiting and disconnection.

Some limiters employ, for example, fuses, such as fusible wire elements to accomplish this function.

It is known to provide a trip indication for a circuit breaker limiter through a button visible at the top surface thereof. The button changes position responsive to a spring when the button is released by a fused wire element. For example, the button “pops” above the surface of the limiter when the fused wire element burns opens during a fault. See, for example, U.S. Patent Application Publication No. 2006/0267720.

There is room for improvement in electrical switching apparatus and in limiters for such apparatus.

There is also room for improvement in indicators for limiters.

SUMMARY OF THE INVENTION

These needs and others are met by embodiments of the invention, which provide a limiter including plural current limiters, each of which comprises a first end disposed proximate a first housing surface and being electrically connected to a corresponding first terminal, a second end disposed proximate a second housing surface and being electrically connected to a corresponding second terminal, and an elongated body disposed between the first and second ends. In some embodiments, the corresponding first and second terminals are disposed proximate the first housing surface, and a conductor of the corresponding second terminal is disposed proximate the second housing surface. In other embodiments, indicator members for the current limiters are disposed in different orientations, in order that plural indicators for the current limiters are disposed in a straight or a substantially straight line.

In accordance with one aspect of the invention, a limiter comprises: a housing comprising a first surface, a second surface opposite and distal from the first surface, and a plurality of sides disposed between the first surface and the second surface; a plurality of first terminals disposed proximate the first surface; a plurality of second terminals disposed proximate the first surface, each of the second terminals comprising a conductor disposed proximate the second surface; and a plurality of current limiters, each of the current limiters comprising a first end disposed proximate the first surface and being electrically connected to a corresponding one of the first terminals, a second end disposed proximate the second surface and being electrically connected to the conductor of a corresponding one of the second terminals, and an elongated body disposed between the first end and the second end.

As another aspect of the invention, a limiter comprises: a housing comprising a first surface, a second surface opposite and distal from the first surface, and a plurality of sides disposed between the first surface and the second surface, the second surface including a plurality of openings disposed along a first straight or substantially straight line; a plurality of first terminals; a plurality of second terminals; three current limiters, each of the current limiters comprising a first end disposed proximate the first surface and being electrically connected to a corresponding one of the first terminals, a second end disposed proximate the second surface and being electrically connected to a corresponding one of the second terminals, an elongated body disposed between the first end and the second end, and a plunger, the first end including an aperture, the plunger being disposable through the aperture, the plunger of a first one of the current limiters and the plunger of a second one of the current limiters defining a second straight or substantially straight line, and the plunger of a third one of the current limiters being offset from the second straight or substantially straight line; three indicator members, each of the indicator members comprising a first end, a second end opposite and distal from the last such first end, and an indicator disposed from the last such first end, the last such second end being engaged by the plunger of a corresponding one of the current limiters, the indicator being disposable through a corresponding one of the openings of the second surface of the housing; and three spring members, each of the spring members biasing a corresponding one of the indicator members away from the second surface of the housing, wherein the housing is structured to carry two of the indicator members in a first orientation and another one of the indicator members in a different second orientation, in order that the indicator of each of the indicator members is positioned in a third straight or substantially straight line and is disposable through the corresponding one of the openings of the second surface of the housing.

The housing may further comprise a base and a cover; the cover may include a number of grooves for each of the indicator members; and each of the indicator members may further comprise a number of protrusions carried by the number of grooves.

The cover may include a plurality of grooves for each of the indicator members; each of the indicator members may further comprise a plurality of protrusions carried by a corresponding plurality of the grooves; and the grooves may carry such two of the indicator members in the first orientation and such another one of the indicator members in the different second orientation, in order that the indicators of the three indicator members are positioned in the third straight or substantially straight line and are disposable through the openings of the second surface of the housing.

The protrusions may maintain the first orientation or the different second orientation of the corresponding one of the indicator members when the corresponding one of the indicator members is biased away from the second surface of the housing and when the indicator of the corresponding one of the indicator members is disposed through a corresponding one of the openings of the second surface of the housing.

As another aspect of the invention, a trip indicator member is for a current limiter including a plunger. The trip indicator member comprises: a first end; a second end opposite and distal from the first end; a periphery including a number of alignment protrusions, each of the number of alignment protrusions being slidably engageable by a number of corresponding grooves; and a trip indicator disposed from the first end, the second end being engageable by the plunger of the current limiter, the trip indicator being disposable through an opening of a housing, and the first end being engageable by a spring member.

As another aspect of the invention, an electrical switching apparatus comprises: a circuit interrupter comprising: a housing, a plurality of first terminals, a plurality of second terminals, a plurality of separable contacts, each of the separable contacts being electrically connected between a corresponding pair of the first and second terminals, and an operating mechanism structured to open and close the separable contacts; and a limiter comprising: a housing comprising a first surface, a second surface opposite and distal from the first surface, and a plurality of sides disposed between the first surface and the second surface, the second surface including a plurality of openings disposed along a first straight or substantially straight line, a plurality of third terminals disposed proximate the first surface, a plurality of fourth terminals, each of the fourth terminals comprising a conductor disposed proximate the second surface, three current limiters, each of the current limiters comprising a first end disposed proximate the first surface and being electrically connected to a corresponding one of the third terminals, a second end disposed proximate the second surface and being electrically connected to the conductor of a corresponding one of the fourth terminals, an elongated body disposed between the first end and the second end, and a plunger, the first end including an aperture, the plunger being disposable through the aperture, the plunger of a first one of the current limiters and the plunger of a second one of the current limiters defining a second straight or substantially straight line, and the plunger of a third one of the current limiters being offset from the second straight or substantially straight line, three indicator members, each of the indicator members comprising a first end, a second end opposite and distal from the last such first end, and an indicator disposed from the last such first end, the last such second end being engaged by the plunger of a corresponding one of the current limiters, the indicator being disposable through a corresponding one of the openings of the second surface of the housing, and three spring members, each of the spring members biasing a corresponding one of the indicator members away from the second surface of the housing, wherein the housing is structured to carry two of the indicator members in a first orientation and another one of the indicator members in a different second orientation, in order that the indicator of each of the indicator members is positioned in a third straight or substantially straight line and is disposable through the corresponding one of the openings of the second surface of the housing, and wherein for each pair of the first and second terminals, one of the first and second terminals is electrically connected to a corresponding one of the third and fourth terminals.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
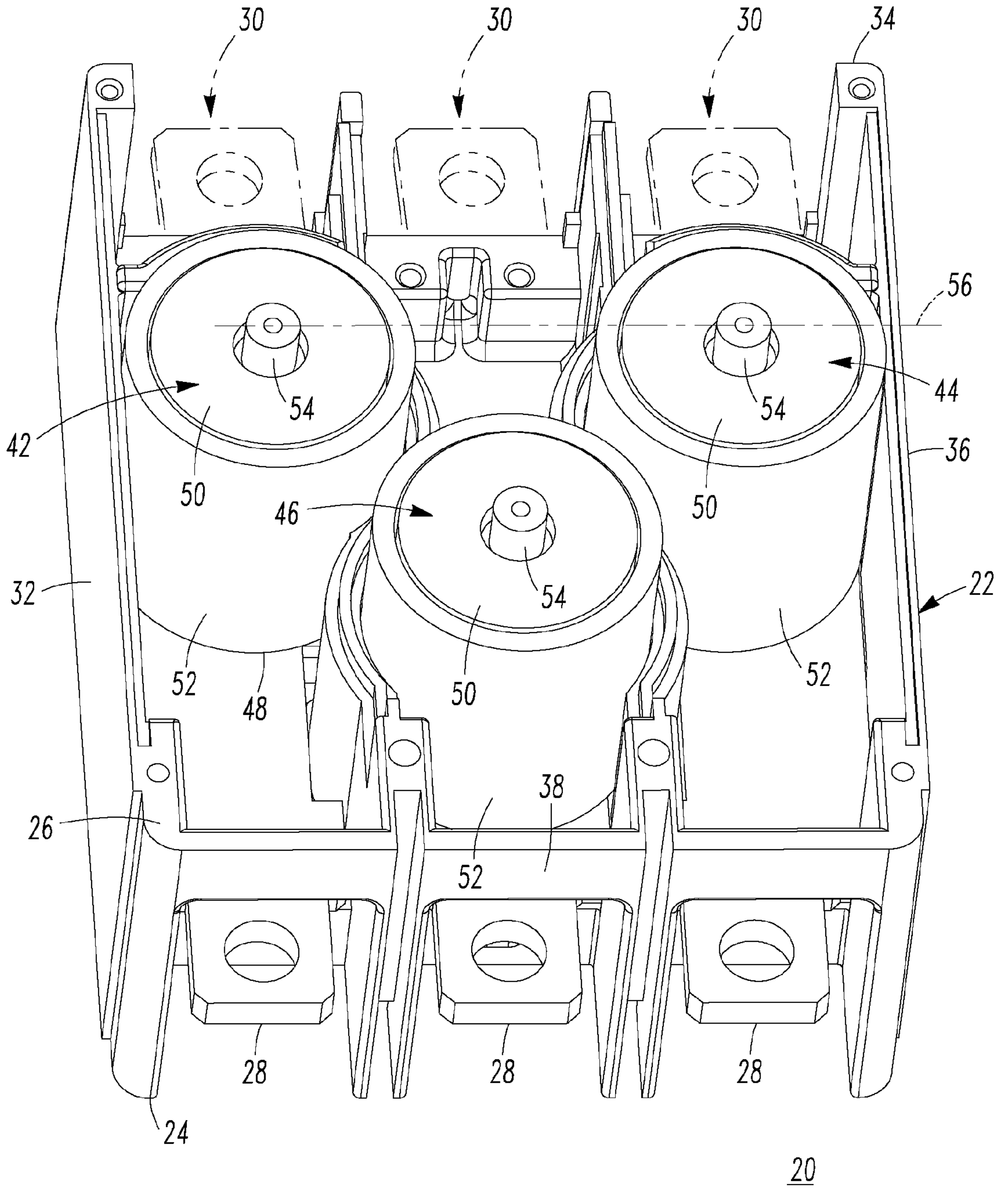
FIG. 1 is an isometric view of a three-pole current limiter with some components removed to show internal structures in which the individual current limiters are positioned on-end in accordance with an embodiment of the invention.

Directional phrases used herein, such as, for example, left, right, front, back, top, bottom and derivatives thereof, relate to the orientation of the elements shown in the drawings and are not limiting upon the claims unless expressly recited therein.

As employed herein, the term "number" shall mean one or an integer greater than one (i.e., a plurality).

As employed herein, the term "fastener" refers to any suitable connecting or tightening mechanism expressly including, but not limited to, screws, bolts and the combinations of bolts and nuts (e.g., without limitation, lock nuts) and bolts, washers and nuts.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The invention is described in association with a limiter for a three-pole circuit breaker including three trip indicator members, although the invention is applicable to a wide range of limiters for electrical switching apparatus, such as, for example, circuit interrupters, having plural poles and to an indicator member for a limiter having one or more poles.

Referring to FIG. 1, a three-pole limiter 20 includes a housing 22 (a portion of which, including a cover, is not shown for convenience of illustration in order to show internal structures) having a first surface 24, a second surface 26 opposite and distal from the first surface 24, a plurality of first terminals 28 (e.g., without limitation, load terminals) disposed proximate the first surface 24, a plurality of second terminals 30 (shown in phantom line drawing in FIG. 1; shown in FIG. 2) (e.g., without limitation, line terminals), and a plurality of sides 32,34,36,38 disposed between the first and second surfaces 24,26. Each of the second terminals 30 includes a conductor 40 (FIG. 2) disposed proximate the second surface 26. Three current limiters 42,44,46 are housed by the housing 22 and include (as shown with current limiter 42) a first end 48 disposed proximate the first surface 24 and being electrically connected to a corresponding one of the first terminals 28, a second end 50 disposed proximate the second surface 26 and being electrically connected to the conductor 40 (FIG. 2) of a corresponding one of the second terminals 30, and an elongated body 52 disposed between the first and second current limiter ends 48,50. In other words, the individual current limiters 42,44,46 are positioned "on-end" (i.e., the central axis of the current limiter is disposed at about 90 degrees (about normal) with respect to the generally longitudinal axis of the line and load terminals 28,30) on the first terminals 28 in the three-pole current limiter housing 22. This enables the three-pole limiter housing 22 to be relatively shorter in length than if the three current limiters 42,44,46 were positioned on their sides (not shown).

A non-limiting example of the current limiters 42,44,46 is a model NB Tri-Pac Limiter 800NBP20 marketed by Eaton Electrical, Inc. of Beaver, Pa.

As shown in FIG. 1, the first current limiter 42 is proximate the first and second sides 32,34, the second current limiter 44 is proximate the second and third sides 34,36, and the third current limiter 46 is proximate the fourth side 38. The elongated generally cylindrical bodies 52 of the current limiters 42,44,46 are disposed in a V-shaped configuration (as best shown in FIG. 2) within the housing 22.

The individual current limiters 42,44,46 preferably each include a plunger 54 disposed from the second end 50 thereof. The plungers 54 of the first and second current limiters 42,44 define a straight or substantially straight line 56, and the plunger 54 of the third current limiter 46 is offset from the straight or substantially straight line 56. The plungers 54 extend away from the current limiter bodies 52 and away from the ends 48,50 in order to indicate to the user what specific pole(s) is(are) open circuit(s) as resulting from short circuit condition(s).

Figure 2:
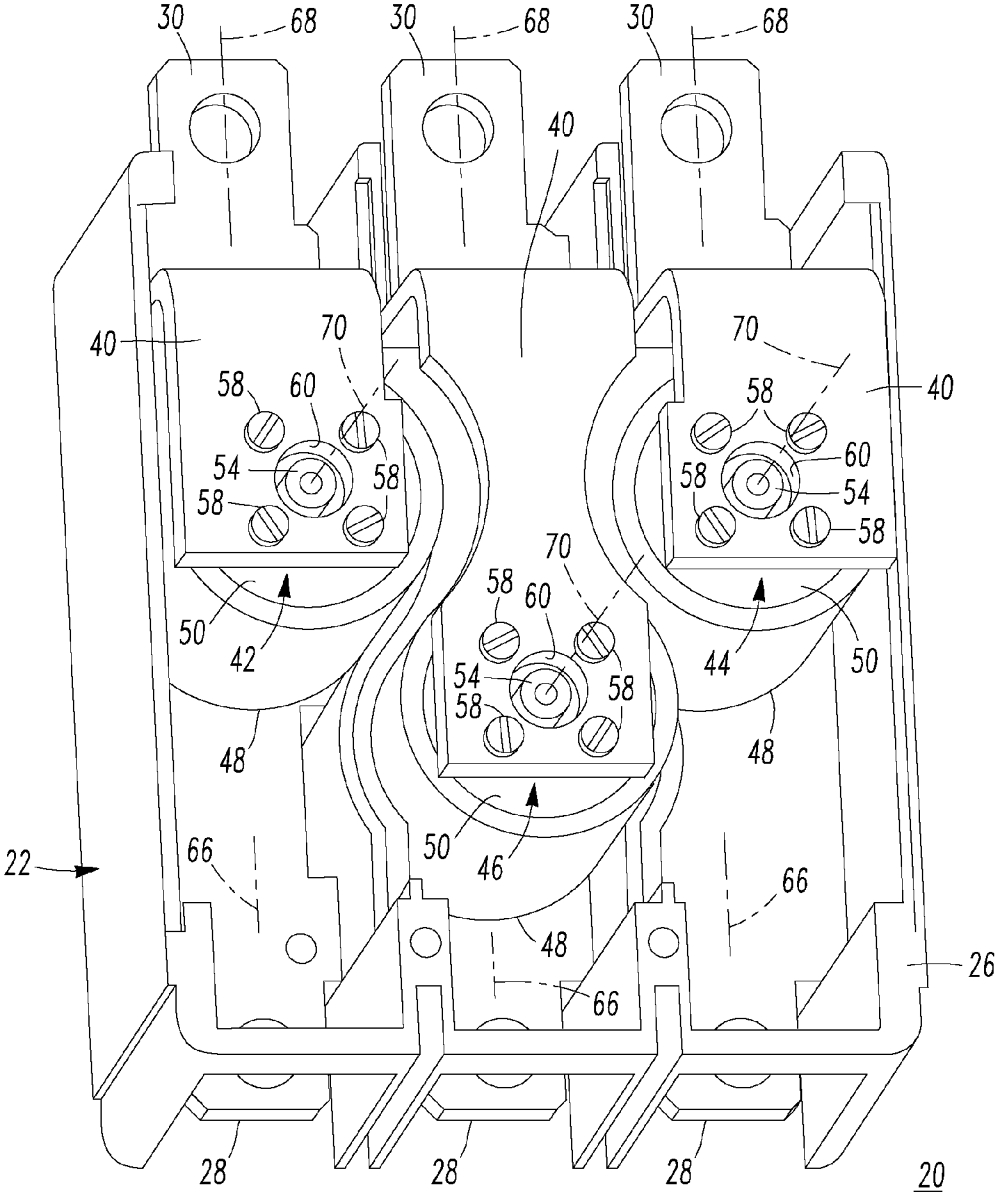
FIG. 2 is an isometric view of the three-pole current limiter of FIG. 1, except modified to show the line terminals.
Figure 5:
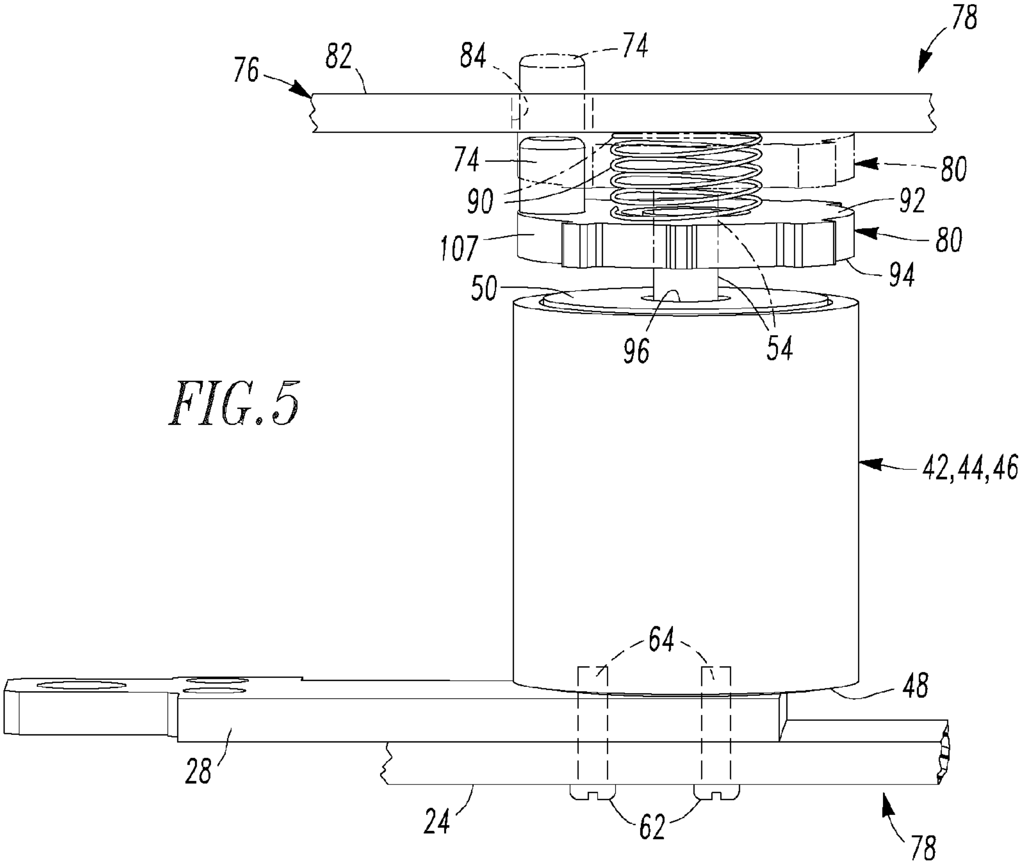
FIG. 5 is an isometric view of the load terminal, current limiter and indicator member of FIG. 4 including an indicator spring.

As shown in FIG. 2, each of the conductors 40 of the second terminals 30 is electrically connected to the second end 50 of the corresponding current limiter 42,44,46 with four screws 58. A hole 60 in the conductor 40 of each second terminal 30 permits that terminal to clear the plunger 54 when it extends outwardly from the current limiters 42,44,46, as will be discussed. Each first terminal 28 is similarly electrically connected to the first end 48 of the corresponding current limiter 42,44,46. There, four screws 62 (not shown in FIGS. 1 and 2; two screws 62 are shown in FIG. 5) go through the bottom (with respect to FIGS. 1, 2 and 5) of the current limiter housing 22 (or the housing 78 of FIG. 5), go through the corresponding first terminal 28 and are threaded into openings 64 (FIG. 5) in the first end 48 of the corresponding current limiter 42,44,46.

Continuing to refer to FIG. 2, each of the first terminals 28 has a first generally longitudinal axis 66, the conductor 40 of each of the second terminals 30 has a second generally longitudinal axis 68, and the plunger 54 of each of the current limiters 42,44,46 has a third longitudinal axis 70, which is normal to the first and second generally longitudinal axes 66,68.

Figure 3:
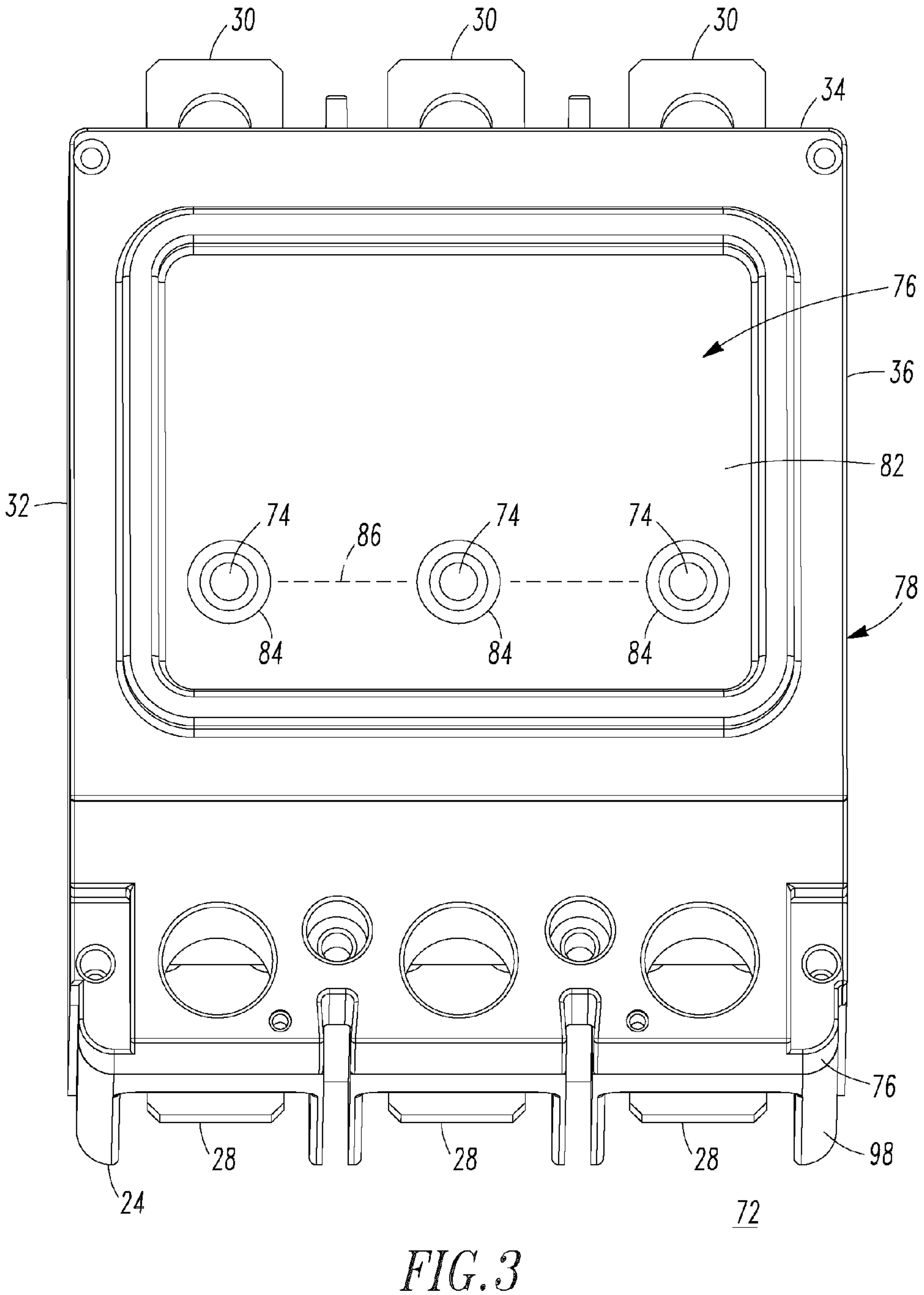
FIG. 3 is an isometric view of a three-pole current limiter in which the indicators are in the normal position in accordance with another embodiment of the invention.

FIG. 3 shows another three-pole current limiter 72 in which three indicators 74 are in a normal position (e.g., flush or somewhat recessed with respect to the cover 76 of the housing 78). The three-pole current limiter 72 may be substantially the same as the three-pole current limiter 20 of FIGS. 1 and 2, except for the presence and the positions of the three indicators 74 as held by the housing 78, as will be explained.

Figure 4:
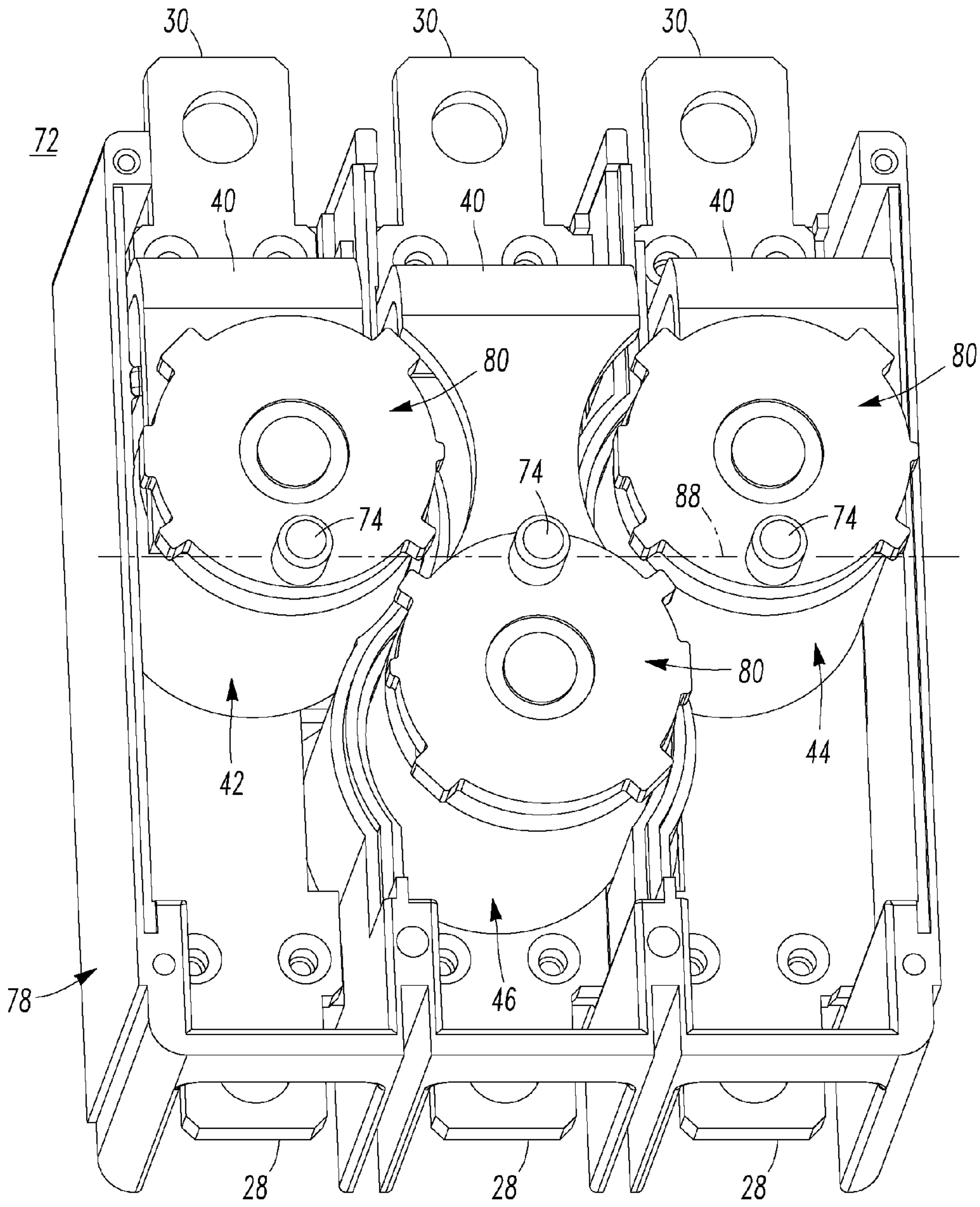
FIG. 4 is an isometric view of the three-pole current limiter of FIG. 3 with some components removed to show internal structures.

Also referring to FIG. 4, the cover 76 (FIG. 3) of the three-pole current limiter 72 is removed to show the three indicators 74 and the corresponding current limiters 42,44,46, which current limiters are held by the housing 78 in a similar manner as they are held by the housing 22 of FIGS. 1 and 2. The indicators 74 are carried by indicator members 80 (shown in FIGS. 4-6), which rest on the plungers 54 (FIG. 5) of the current limiters 42,44,46 of FIG. 4. The orientation of two of the indicator members 80 (associated with current limiters 42,44) is rotated by about 180 degrees with respect to the different orientation of the other indicator member 80 (associated with current limiter 46).

As shown in FIG. 3, the limiter cover 76 has a surface 82 with three openings 84 disposed along a straight or substantially straight line 86. As was shown in FIG. 1, only the plungers 54 of the current limiters 42,44 define the straight or substantially straight line 56, while the plunger 54 of the other current limiter 46 is offset from the straight or substantially straight line 56. As will be discussed, below, in connection with FIG. 7, the indicator members 80 (shown in phantom line drawing) and the housing 78 are structured to carry two of the indicator members 80 (associated with current limiters 42,44) in an opposite orientation with respect to the orientation of the other indicator member 80 (associated with current limiter 46), in order that the indicator 74 of each of the indicator members 80 is positioned in a straight or substantially straight line 88 (FIG. 4) and is disposable through the corresponding one of the openings 84 (FIG. 3) of the housing surface 82.

Referring to FIG. 5, one of the load terminals 28, one of the current limiters 42,44,46, one of the indicator members 80 and an indicator spring 90 are shown within the housing 78 (which is only partially shown for convenience of illustration). As best shown in FIG. 5, each of the indicators 74 (e.g., without limitation, knobs) (only one indicator 74 is shown in FIG. 5) is disposable through the corresponding one of the openings 84 (only one opening 84 is shown in FIG. 5) of the housing surface 82. Normally, however, the indicator 74 is either flush with or slightly recessed from the surface 82 for the closed circuit condition of the corresponding one of the current limiters 42,44,46. Each of the indicator members 80 includes a first end 92, and a second end 94 opposite and distal from the first end 92, with the indicator 74 being disposed from the first end 92. The indicator member second end 94 is engaged by the plunger 54 of a corresponding one of the current limiters 42,44,46. The indicator spring 90 biases the corresponding indicator member 80 away from the housing surface 82 of the limiter cover 76. The plunger 54 of the corresponding one of the current limiters 42,44,46 is disposable through an aperture 96 of the current limiter end 50 in response to an open circuit condition thereof. Extension of the plunger 54 overcomes the force of the corresponding indicator spring 90 and pushes the corresponding one of the indicators 74 through a corresponding one of the openings 84. As shown in phantom line drawing in FIG. 5, the extended plunger 54 moves the second end 94 and, thus, the first end 92 and the indicator 74 of the corresponding one of the indicator members 80 through the corresponding one of the openings 84 of the housing surface 82.

The assembly of FIG. 5 is mounted into the base 98 and the cover 76 of the housing 78 of FIG. 3. The indicator member 80 and the indicator spring 90 are employed for each pole of the three-pole current limiter 72, in order to provide an indication of the conductive state of the individual current limiters 42,44,46. The indicator member 80 is held in place by plural grooves 101,102,103,104 in the cover 76 (FIG. 7) of the molded housing 78. The indicator member 80 is pushed against the current limiter plunger 54 by the indicator spring 90 to prevent a false "fused" indication of the current limiter state. The corresponding indicator spring 90 biases the corresponding indicator member 80 away from the cover 76 and against the plunger 54 of the corresponding current limiter 42,44,46 regardless of the open circuit condition or the closed circuit condition thereof.

Upon release of the plunger 54 from the corresponding current limiter 42,44,46, which opens during the interruption of a fault, the indicator member 80 is pushed by the plunger 54, which overcomes the bias spring force, toward the housing cover 76 until a portion of the indicator 74 protrudes through (as shown in phantom line drawing in FIG. 5) the corresponding opening 84 in the cover 76. This provides a positive "fused" indicator for the corresponding pole. The indicator member 80 fits in the cover grooves 101,102,103, 104 (FIG. 7) in a reversible fashion for the pole of the current limiter 46, in order to enable the three indicators 74 to be shown uniformly in the straight or substantially straight line 86 (FIG. 3) at the surface 82 of the housing cover 76. Hence, this compensates for the staggered alignment of the three "on-end" current limiters 42,44,46 within the housing 78 of FIG. 4.

Figure 6:
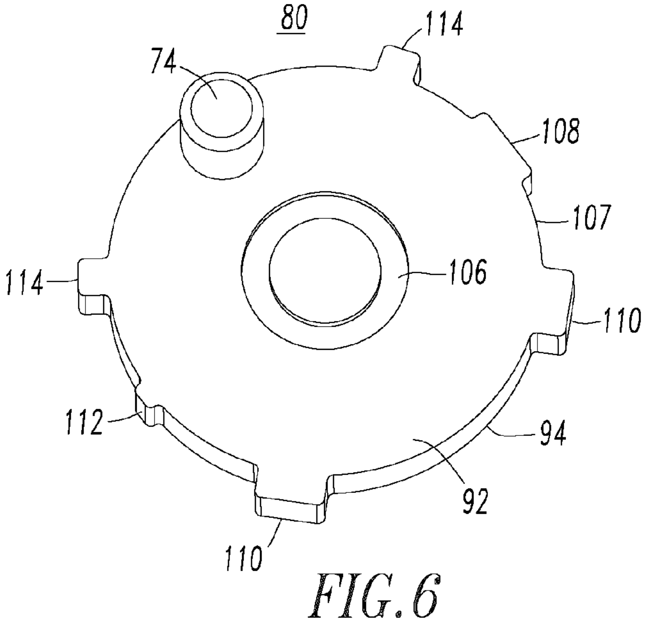
FIG. 6 is an isometric view of the indicator member of FIG. 4.
Figure 7:
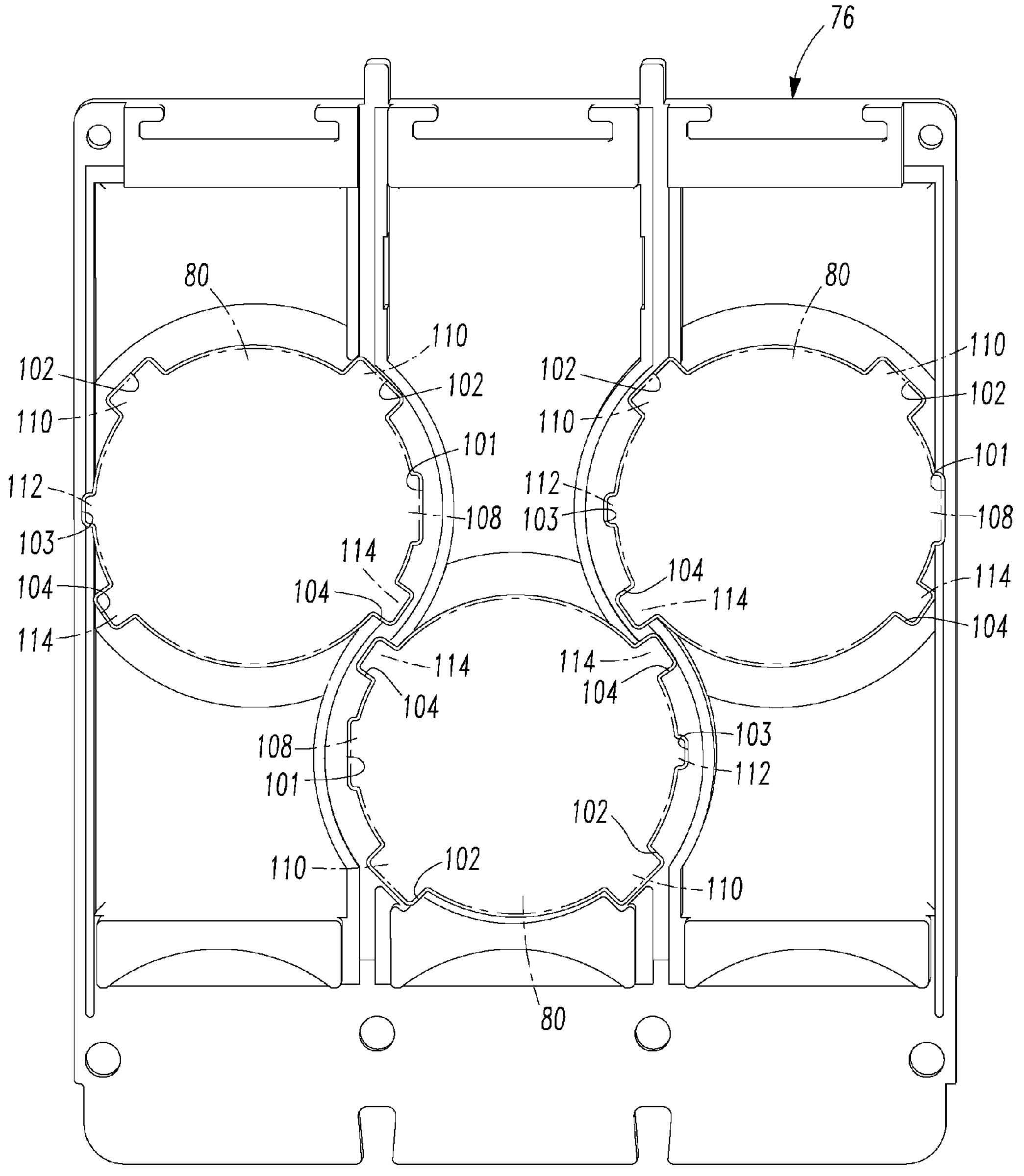
FIG. 7 is a bottom plan view of the molded cover of the housing of FIG. 3.

FIG. 6 shows the indicator member 80 of FIGS. 4 and 5. The indicator 74 shows through (as shown in phantom line drawing in FIG. 5) the corresponding cover opening 84 to indicate the state of the corresponding current limiter 42,44, 46. A seat 106 on the first end 92 is provided for the indicator spring 90 (FIG. 5). The indicator member 80 includes a periphery 107 having six alignment protrusions (e.g., tabs) of various widths 108,110,112,114, which fit into the respective grooves 101,102,103,104 of the housing cover 76 (FIG. 7). These protrusions 108,110,112,114 maintain the orientation of the indicator 74 when the indicator member 80 slides while being pushed by the limiter plunger 54 (FIG. 5) as it is extended. The indicator spring 90 (FIG. 5) is disposed between the indicator member 80 and the cover 76 to bias the indicator member 80 to always engage the current limiter plunger 54 regardless of its normal retracted or extended positions.

As shown in FIG. 7, each of the alignment protrusions 108,110,112,114 (shown in phantom line drawing) is slidably engaged by a number of the corresponding grooves 101,102, 103,104, respectively, of the cover 76. The protrusions 108, 110,112,114 maintain the first orientation or the different second orientation of the corresponding one of the indicator members 80 when that indicator member is biased away from the cover 76 of the housing 78, and when the indicator 74 of that indicator member is disposed through the corresponding housing opening 84 (FIG. 5). The grooves 101,102,103,104 advantageously carry two indicator members 80 in the first orientation and the other indicator member 80 in the different second orientation, in order that the indicators 74 are positioned in the straight or substantially straight line 88 (FIG. 4) and are disposable through the corresponding housing openings 84.

Figure 8:
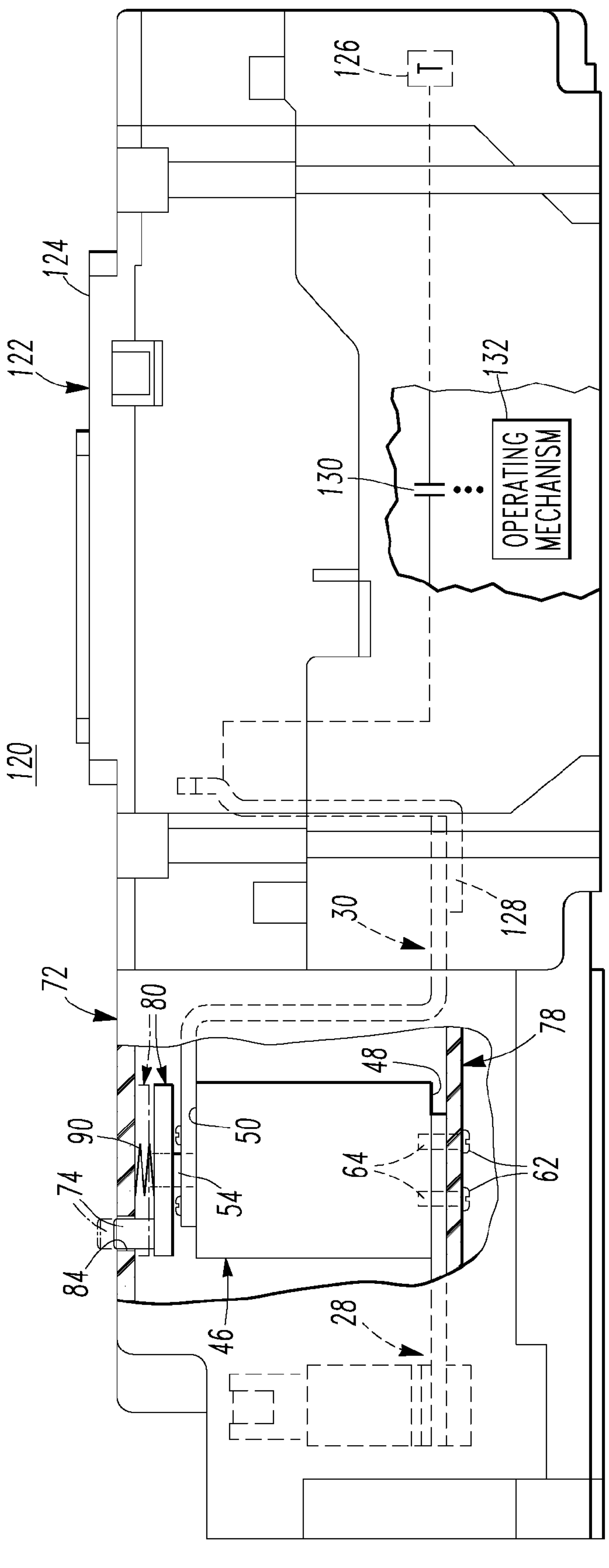
FIG. 8 is a simplified vertical elevation section view of a three-pole circuit breaker and a three-pole limiter in accordance with another embodiment of the invention.

FIG. 8 shows an electrical switching apparatus 120 including a conventional three-pole circuit interrupter, such as circuit breaker 122, and the three-pole limiter 72 of FIG. 3 (for convenience of illustration, only the current limiter 46 is shown). Although not shown, the limiter 20 of FIG. 1 interfaces the circuit breaker 122 in the same manner as does the limiter 72. As is conventional, the circuit breaker 122 includes a housing 124, first terminals (T) 126 (e.g., line) (for convenience of illustration, only one terminal 126 is shown, it being understood that the three-pole circuit breaker 122 has three such terminals), second terminals 128 (e.g., load) (for convenience of illustration, only one terminal 128 is shown, it being understood that the three-pole circuit breaker 122 has three such terminals), three separable contacts 130 (for convenience of illustration, only one pair of separable contacts 130 is shown, it being understood that the three-pole circuit breaker 122 has three such pairs) electrically connected between the corresponding first and second terminals 126, 128, and an operating mechanism 132 structured to open and close the separable contacts 130. The terminals 30 (e.g., line) of the limiter 72 are electrically connected (by a suitable fastener (not shown)) to the corresponding second terminals 128 of the circuit breaker 122.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A limiter comprising:

a housing comprising a first surface, a second surface opposite and distal from said first surface, and a plurality of sides disposed between said first surface and said second surface, said second surface including a plurality of openings disposed along a first straight or substantially straight line;

a plurality of first terminals;

a plurality of second terminals;

three current limiters, each of said current limiters comprising a first end disposed proximate said first surface and being electrically connected to a corresponding one of said first terminals, a second end disposed proximate said second surface and being electrically connected to a corresponding one of said second terminals, an elongated body disposed between said first end and said second end, and a plunger, said first end including an aperture, said plunger being disposable through said aperture, the plunger of a first one of said current limiters and the plunger of a second one of said current limiters defining a second straight or substantially straight line, and the plunger of a third one of said current limiters being offset from said second straight or substantially straight line;

three indicator members, each of said indicator members comprising a first end, a second end opposite and distal from the last said first end, and an indicator disposed from the last said first end, the last said second end being engaged by the plunger of a corresponding one of said current limiters, said indicator being disposable through a corresponding one of the openings of the second surface of said housing; and three spring members, each of said spring members biasing a corresponding one of said indicator members away from the second surface of said housing, wherein said housing is structured to carry two of said indicator members in a first orientation and another one of said indicator members in a different second orientation, in order that the indicator of each of said indicator members is positioned in a third straight or substantially straight line and is disposable through the corresponding one of the openings of the second surface of said housing.

2. The limiter of claim 1 wherein each of said first terminals has a first generally longitudinal axis; wherein each of said second terminals has a second generally longitudinal axis; and wherein the plunger of each of said current limiters has a third longitudinal axis, which is normal to said first generally longitudinal axis and to said second generally longitudinal axis.

3. The limiter of claim 1 wherein the first end of each of said current limiters is fastened to a corresponding one of said first terminals; wherein the second end of each of said current limiters is fastened to a corresponding one of said second terminals; and wherein each of said second terminals includes an opening through which the plunger of the corresponding one of said current limiters is disposed.

4. The limiter of claim 1 wherein the plunger of the corresponding one of said current limiters is disposable through the aperture of the first end of said corresponding one of said current limiters in response to an open circuit condition thereof, in order to move the first end of the corresponding one of said indicator members and the indicator thereof through a corresponding one of the openings of the second surface of said housing.

5. The limiter of claim 1 wherein the first end of each of said current limiters is fastened to a corresponding one of said first terminals with a corresponding first fastener; and wherein the second end of each of said current limiters is fastened to a corresponding one of said second terminals with a corresponding second fastener.

6. The limiter of claim 1 wherein said housing further comprises a base and a cover; wherein said cover includes a number of grooves for each of said indicator members; and wherein each of said indicator members further comprises a number of protrusions carried by said number of grooves.

7. The limiter of claim 1 wherein the first end of each of said indicator members includes a seat for a corresponding one of said spring members.

8. The limiter of claim 7 wherein the corresponding one of said spring members biases the corresponding one of said indicator members away from the second surface of said housing and against the plunger of the corresponding one of said current limiters in response to a closed circuit condition of said corresponding one of said current limiters.

9. The limiter of claim 1 wherein said housing further comprises a base and a cover; wherein said cover includes a plurality of grooves for each of said indicator members; wherein each of said indicator members further comprises a plurality of protrusions carried by a corresponding plurality of said grooves; and wherein said grooves carry said two of said indicator members in the first orientation and said another one of said indicator members in the different second orientation, in order that the indicators of said three indicator members are positioned in the third straight or substantially straight line and are disposable through the openings of the second surface of said housing.

10. The limiter of claim 9 wherein the first orientation of said two of said indicator members is rotated by about 180 degrees with respect to the different second orientation of said another one of said indicator members.

11. The limiter of claim 9 wherein said protrusions maintain the first orientation or the different second orientation of the corresponding one of said indicator members when the corresponding one of said indicator members is biased away from the second surface of said housing and when the indicator of the corresponding one of said indicator members is disposed through a corresponding one of the openings of the second surface of said housing.

12. The limiter of claim 1 wherein the plunger of the corresponding one of said current limiters is extendable through the aperture of the first end of said corresponding one of said current limiters in response to an open circuit condition thereof; and wherein upon extension of the plunger of the corresponding one of said current limiters, said plunger of the corresponding one of said current limiters overcomes the force of the corresponding one of said spring members, and pushes the corresponding one of said indicators through a corresponding one of the openings of the second surface of said housing.

13. The limiter of claim 12 wherein said indicator is a knob, which protrudes through the corresponding one of the openings of the second surface of said housing.

14. The limiter of claim 1 wherein said housing further comprises a base and a cover; wherein each of said current limiters has a closed circuit condition or an open circuit condition; and wherein a corresponding one of said spring members biases the corresponding one of said indicator members away from said cover and against the plunger of the corresponding one of said current limiters regardless of the open circuit condition or the closed circuit condition of said corresponding one of said current limiters.

15. A trip indicator member for a current limiter including a plunger, said trip indicator member comprising:

a first end;

a second end opposite and distal from said first end;

a periphery including a number of alignment protrusions, each of said number of alignment protrusions being slidably engageable by a number of corresponding grooves; and a trip indicator disposed from said first end, said second end being engageable by the plunger of said current limiter, said trip indicator being disposable through an opening of a housing, and said first end being engageable by a spring member.

16. An electrical switching apparatus comprising:

a circuit interrupter comprising;

a housing, a plurality of first terminals, a plurality of second terminals, a plurality of separable contacts, each of said separable contacts being electrically connected between a corresponding pair of said first and second terminals, and an operating mechanism structured to open and close said separable contacts; and a limiter comprising:

a housing comprising a first surface, a second surface opposite and distal from said first surface, and a plurality of sides disposed between said first surface and said second surface, said second surface including a plurality of openings disposed along a first straight or substantially straight line, a plurality of third terminals disposed proximate said first surface, a plurality of fourth terminals, each of said fourth terminals comprising a conductor disposed proximate said second surface, three current limiters, each of said current limiters comprising a first end disposed proximate said first surface and being electrically connected to a corresponding one of said third terminals, a second end disposed proximate said second surface and being electrically connected to the conductor of a corresponding one of said fourth terminals, an elongated body disposed between said first end and said second end, and a plunger, said first end including an aperture, said plunger being disposable through said aperture, the plunger of a first one of said current limiters and the plunger of a second one of said current limiters defining a second straight or substantially straight line, and the plunger of a third one of said current limiters being offset from said second straight or substantially straight line, three indicator members, each of said indicator members comprising a first end, a second end opposite and distal from the last said first end, and an indicator disposed from the last said first cad, the last said second end being engaged by the plunger of a corresponding one of said current limiters, said indicator being disposable through a corresponding one of the openings of the second surface of said housing, and three spring members, each of said spring members biasing a corresponding one of said indicator members away from the second surface of said housing, wherein said housing is structured to carry two of said indicator members in a first orientation and another one of said indicator members in a different second orientation, in order that the indicator of each of said indicator members is positioned in a third straight or substantially straight line and is disposable through the corresponding one of the openings of the second surface of said housing, and wherein for each pair of said first and second terminals, one of said first and second terminals is electrically connected to a corresponding one of said third and fourth terminals.

17. A limiter comprising;

a housing comprising a first surface, a second surface opposite and distal from said first surface, and a plurality of sides disposed between said first surface and said second surface;

a plurality of first terminals disposed proximate said first surface;

a plurality of second terminals disposed proximate said first surface, each of said second terminals comprising a conductor disposed proximate said second surface;

a plurality of current limiters, each of said current limiters comprising a first end disposed proximate said first surface and being electrically connected to a corresponding one of said first terminals, a second end disposed proximate said second surface and being electrically connected to the conductor of a corresponding one of said second terminals, and an elongated body disposed between said first end and said second end; and wherein said plurality of current limiters are a first current limiter, a second current limiter and a third current limiter; wherein said elongated body is an elongated generally cylindrical body; and wherein the elongated generally cylindrical body of said first current limiter, the elongated generally cylindrical body of said second current limiter and the elongated generally cylindrical body of said third current limiter are disposed in a V-shaped configuration within said housing.

18. A limiter comprising:

a housing comprising a first surface, a second surface opposite and distal from said first surface, and a plurality of sides disposed between said first surface and said second surface;

a plurality of first terminals disposed proximate said first surface;

a plurality of second terminals disposed proximate said first surface, each of said second terminals comprising a conductor disposed proximate said second surface;

a plurality of current limiters, each of said current limiters comprising a first end disposed proximate said first surface and being electrically connected to a corresponding one of said first terminals, a second end disposed proximate said second surface and being electrically connected to the conductor of a corresponding one of said second terminals, and an elongated body disposed between said first end and said second end; and wherein each of said current limiters further comprises a plunger disposed from the second end thereof; wherein said plurality of current limiters are a first current limiter, a second current limiter and a third current limiter; wherein the plunger of said first current limiter and the plunger of said second current limiter define a straight or substantially straight line; and wherein the plunger of said third current limiter is offset from said straight or substantially straight line.

* * * * *